E. J. HEITMAN.
ELECTRIC METER.
APPLICATION FILED JUNE 14, 1917.
1,301,434.
Patented Apr. 22, 1919.
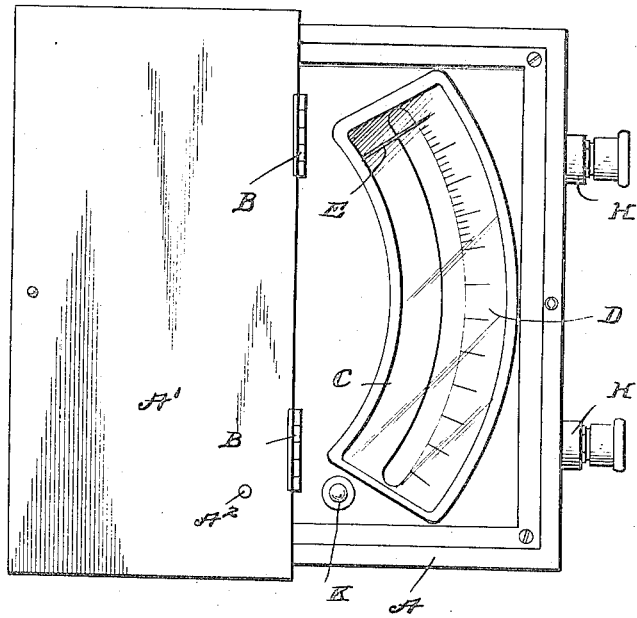
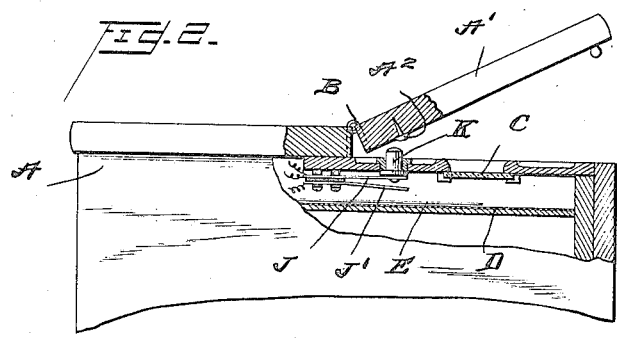
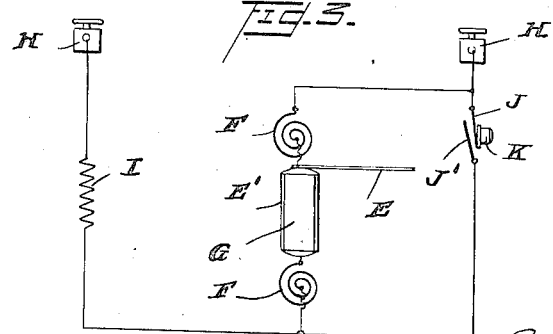

UNITED STATES PATENT OFFICE.

EDWIN JOSEPH HEITMAN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

ELECTRIC METER.

1,301,434. Specification of Letters Patent. Patented Apr. 22, 1919.

Application filed June 14, 1917. Serial No. 174,695.

*To all whom it may concern:*

Be it known that I, EDWIN JOSEPH HEITMAN, a citizen of the United States of America, residing in the city and county of Philadelphia, State of Pennsylvania, have invented certain new and useful Improvements in Electric Meters, of which the following is a true and exact description, reference being had to the accompanying drawings, which form a part thereof.

My present invention relates to an electric meter of the type comprising a movable element and a winding deflecting said element when an electric current flows through the winding, and particularly to portable sensitive meters of this type, such as are used as electric pyrometers and millivolt meters; and the object of my invention is to provide novel means for effectively damping the oscillations of the movable element of an instrument of this type when the instrument is not in use.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of my invention.

Of the drawings:

Figure 1 is a plan view of a portable electric meter constructed in accordance with the present invention.

Fig. 2 is an elevation, partly in section, of a portion of the apparatus shown in Fig. 1, and Fig. 3 is a diagrammatic representation of circuit connections of the instrument shown in Figs. 1 and 2.

In the drawings, A represents the casing of a portable sensitive electric meter of the type commonly employed for use as an electric pyrometer or millivolt meter. The hinged lid or door A' of the casing when closed covers, and when opened exposes, a window C, through which the position of the pointer E with reference to the scale D may be observed. The pointer E is carried by, and forms a part of the movable element of the meter, which, in the form illustrated in Fig. 3, comprises a coil E', surrounding a stationary magnetic core G. The coil E' is connected at its ends to light delicate springs F, which serve the double function of forming a part of the circuit connection between the ends of the coil E' and the binding posts H, and of impressing the necessary loading torque on the coil E'. The position of the latter in operation, is determined by the balancing of the torque exerted in one direction on the coil E by the springs F, by the opposing torque due to the electromagnetic interaction between the coil and the magnetic body G. In so far as above described the instrument disclosed is of a type well known and in common use and involves nothing now novel with me.

With an instrument of the type disclosed it is necessary, or at least desirable, to guard against undue oscillations of the movable coil E' and pointer E when the instrument is moved, the springs F being too light and delicate to prevent such oscillations from occurring when the instrument is subjected to slight shocks or jars. I have discovered that these oscillations may be substantially damped by short circuiting the coil E', and for this purpose have provided short circuiting provisions comprising a pair of flexible switch contact members J and J', and a button or plunger K for forcing the contact member J into contact with the member J'.

My invention is especially directed to instruments of high sensitivity in which it is necessary to reduce the weight of the movable element to a minimum, and in which the light metal frame on which the coil is wound in less sensitive instruments is therefore omitted. Where the frame is used Foucault or eddy currents are developed in the frame when motion is given to the movable elements, which have a retarding or damping effect on the movements of the element even when no current is flowing through the coil. Where no frame is used, however, Foucault currents can only develop in the movable coil itself when its circuit is closed and the strength and consequent controlling force or damping action of such currents depends directly upon the number of ampere turns in the movable coil and the resistance of the entire circuit. The instrument resistance, especially where a series resistor is used for purposes of adjustment, is so great that where the circuit is closed, as by a wire connecting the binding posts, the eddy currents developed in the movable element are feeble and insufficient to properly damp the movements of the movable elements. Hence I prefer to provide for short circuiting the movable element with exclusion of the instrument resistance from the circuit so that the eddy currents developed in the coil will be sufficiently powerful to retard the swing of the coil and preserve it from injury in transportation.

Advantageously the button K is so arranged relative to the casing door A', that when the latter is closed the short circuit connection about the coil E' will be automatically established, and will be automatically broken when the door is opened. This is accomplished by so locating the plunger K that the door A' will impinge against the outer end of the plunger K and thereby move the contact J against the contact J' when the door is closed, while when the door is opened the resistance of the contact member J will move the latter out of engagement with the member J', and return the button K to position shown in Fig. 2. Advantageously the cover A' may be provided with a metallic part A², shown as formed by the head of a tack for engaging the plunger K.

While in accordance with the provisions of the statutes I have illustrated and described the best form of my invention now known to me, it will be apparent to those skilled in the art that changes may be made in form of the apparatus disclosed without departing from the spirit of the invention set forth in the following claims.

Having now described my invention, what I claim as new and desire to secure by Letters Patent, is:

1. An electric meter comprising a movable element, including a coil or winding inclosed in a magnetic field produced by a permanent magnet or magnets, a permanent magnet for creating such magnetic field, a resistor forming a part of the meter instrument, and in combination therewith means for short circuiting said coil without including the resistor in order to damp the oscillations of said movable element.

2. An electrical instrument comprising a movable element, including a coil or winding inclosed in a magnetic field produced by a permanent magnet or magnets, a permanent magnet for creating such magnetic field, a resistor forming a part of the meter instrument, a housing in which said movable element is mounted, including a door or lid which may be opened for observing the instrument, and a switch mechanism actuated by said door to short circuit the movable coil of said movable element without including the resistor when the door or lid is closed.

3. An electric meter comprising a movable element, a winding for deflecting said element when energized; a housing in which said element and winding are mounted, comprising a door which may be opened to permit the instrument to be observed, and a switch mechanism actuated by said door to short circuit said winding and damp the oscillations of said element when the door is closed.

EDWIN JOSEPH HEITMAN.